April 1, 1958 W. T. PATRICK 2,829,013
VEHICLE TRACKS

Filed Feb. 14, 1956 8 Sheets-Sheet 1

INVENTOR.
WILLARD T. PATRICK

BY Kenway, Jenney,
Witter & Hildreth

ATTORNEYS

April 1, 1958 W. T. PATRICK 2,829,013
VEHICLE TRACKS
Filed Feb. 14, 1956 8 Sheets-Sheet 2
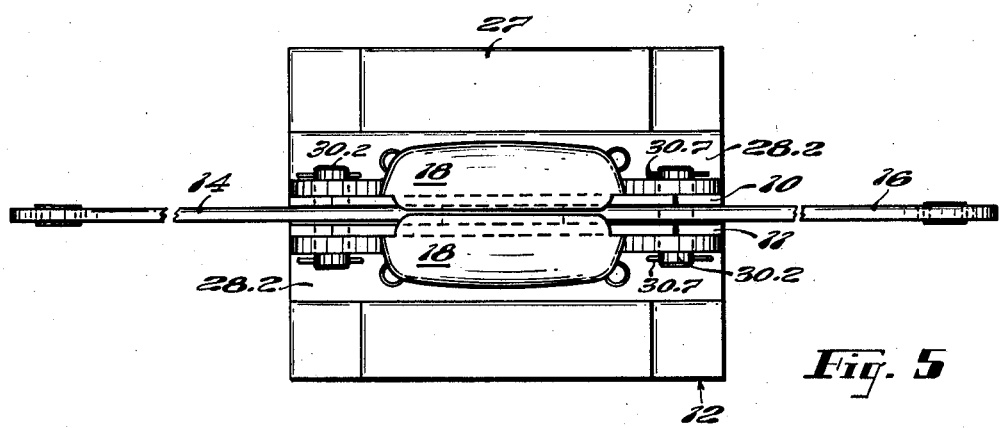
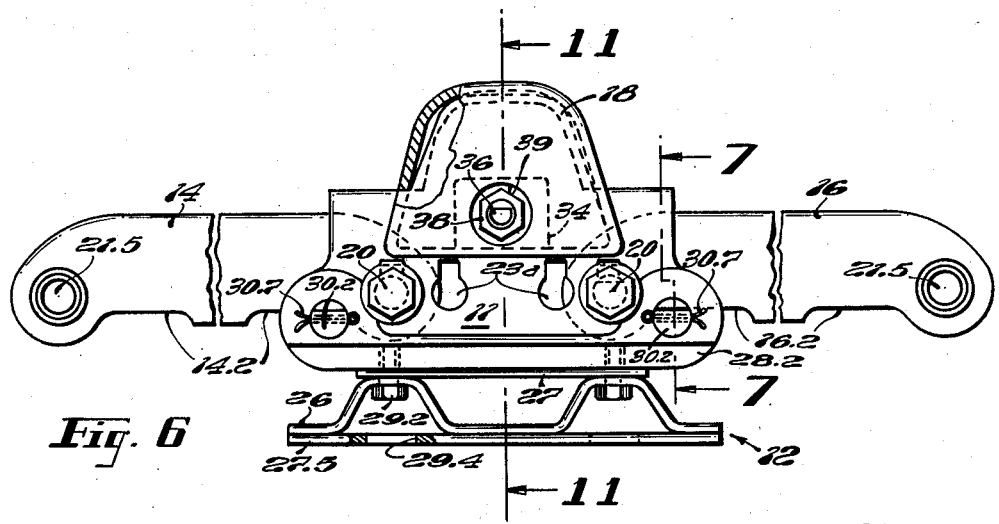
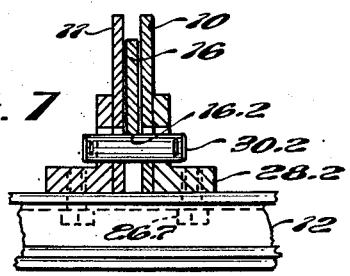
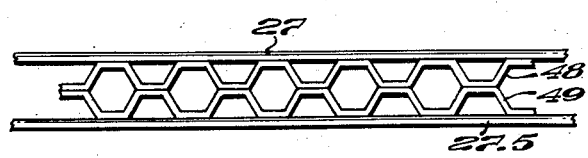
INVENTOR.
WILLARD T. PATRICK
BY *Kenway, Jenney,*
*Witter & Hildreth*
ATTORNEYS

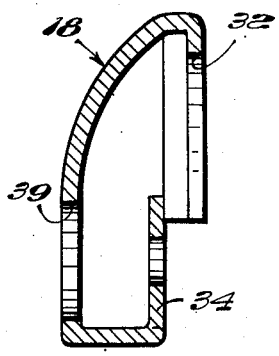
Fig. 9
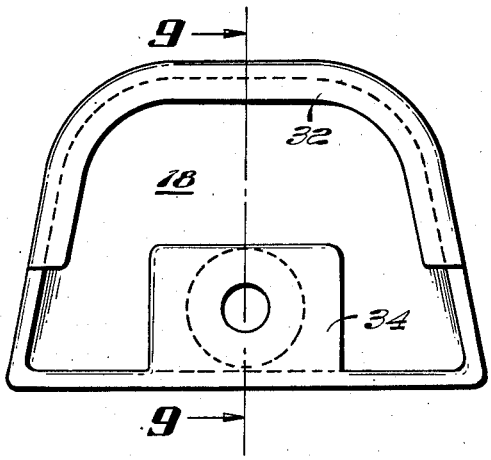
Fig. 10
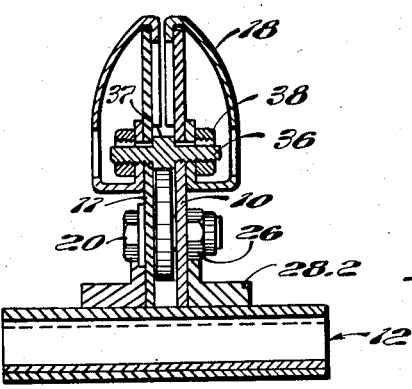
Fig. 11
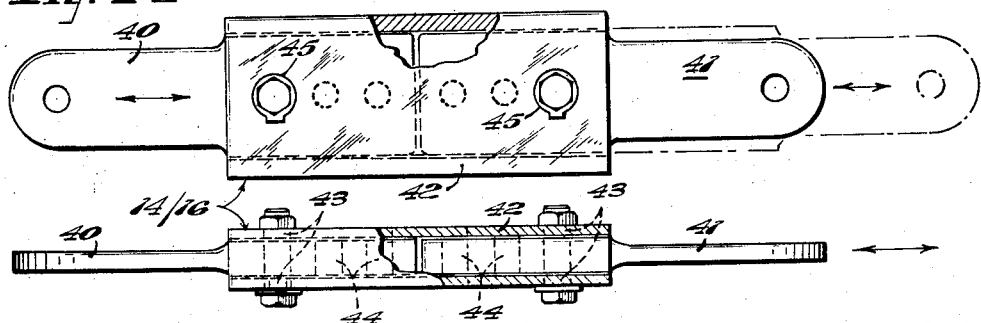
Fig. 12
Fig. 13
INVENTOR.
WILLARD T. PATRICK
BY Kenway, Jenney, Witter + Hildreth
ATTORNEYS

INVENTOR.
WILLARD T. PATRICK

BY Kenway, Jenney,
Witter + Hildreth

ATTORNEYS

INVENTOR.
WILLARD T. PATRICK
BY Kenway, Jenney,
Witter + Hildreth
ATTORNEYS

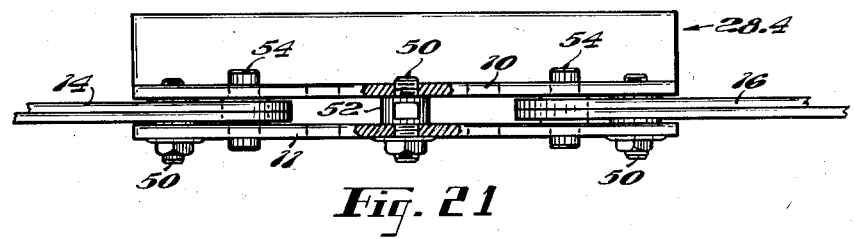
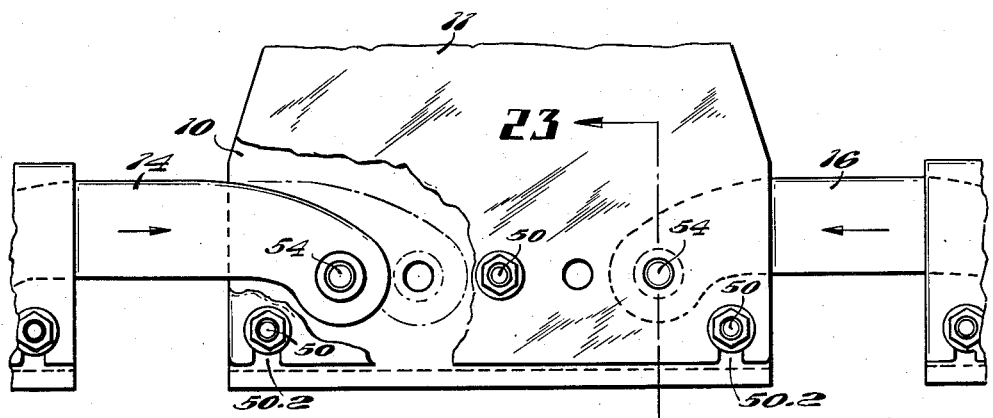
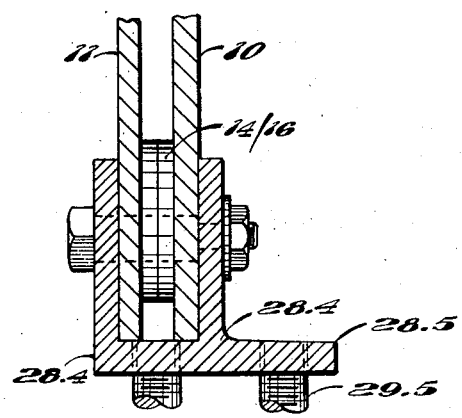
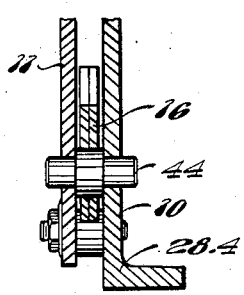

April 1, 1958 W. T. PATRICK 2,829,013
VEHICLE TRACKS
Filed Feb. 14, 1956 8 Sheets-Sheet 7

INVENTOR.
WILLARD T. PATRICK

BY Kenway, Jenney, Witter + Hildreth
ATTORNEYS

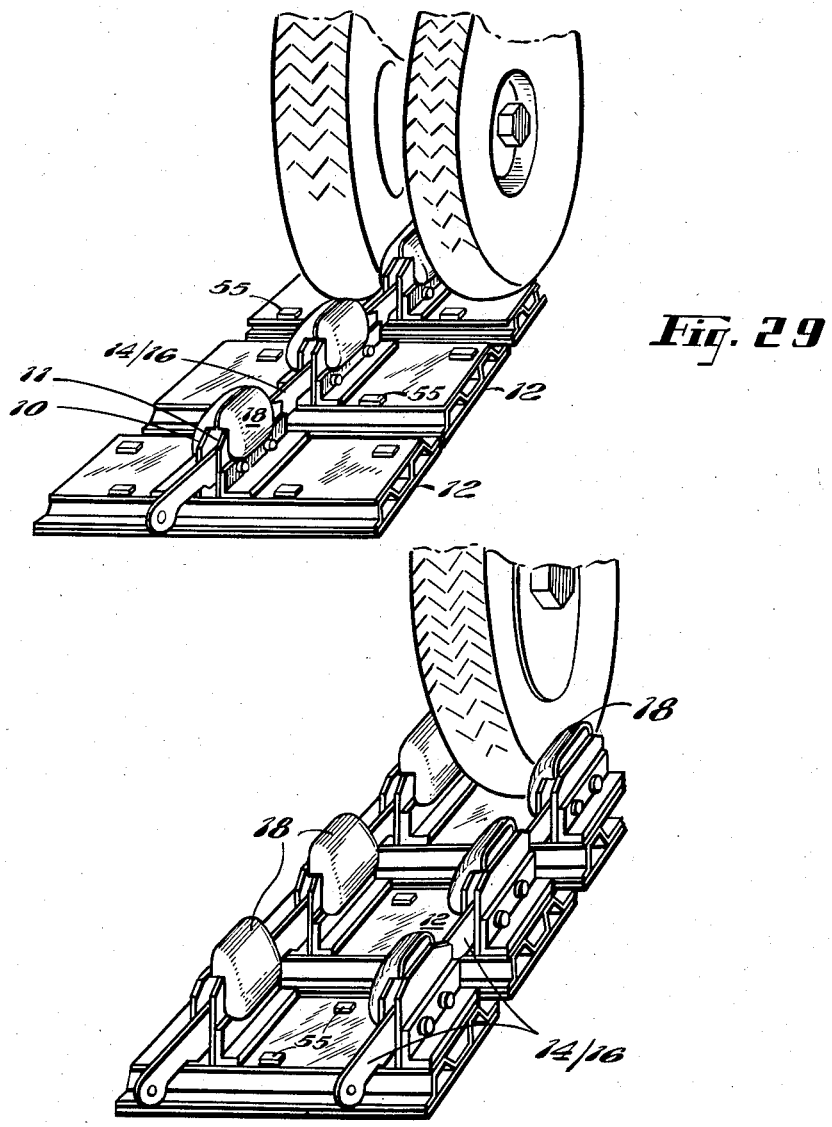

United States Patent Office 2,829,013
Patented Apr. 1, 1958

2,829,013

VEHICLE TRACKS

Willard T. Patrick, Great Neck, N. Y., assignor of one-half to George Reinhardt, New York, N. Y.

Application February 14, 1956, Serial No. 565,351

12 Claims. (Cl. 305—10)

This invention relates to traction equipment for vehicles of various sorts, particularly rubber tired vehicles such as trucks, tractors, cranes and earth moving equipment.

Two important types of traction devices for vehicles are rubber tired wheels and crawler tracks, each of which is widely used and frequently one or the other type is far more suitable under particular conditions than the other. There has thus been a considerable demand for equipment by which conventional tired vehicles may be provided with an endless crawler track and thereby be better adapted for use under conditions favoring crawler track vehicles. Crawler tracks arranged for temporary mounting on trucks and other tired vehicles have been offered in the past, but have generally proved unsatisfactory in not being reliable, long-lasting equipment suitable for heavy civilian industrial use. Those heretofore appearing have been difficult to install and have at best been able to withstand only a few weeks use under ordinary operating conditions.

This invention provides a greatly improved accessory crawler track which may be easily installed or removed and which is of simple inexpensive yet rugged construction which can be counted on to give a long period of reliable operation. Of particular advantage to the crawler track of this invention, is a construction providing an easily varied length and an operation free from fouling by dirt or stones entering the mechanism. In addition, the crawler track of this invention is capable of greater and more flexible articulation than those heretofore known.

The track of this invention consists in general of a heavy chain of articulated members joined together with each carrying a shoe or platform on which the vehicle runs. The chain is made to wrap the wheels of a single or plural tired vehicle and to be joined together at their ends; it thus forms, when installed, an endless track-laying traction device upon which the vehicle runs.

An important feature of the track of this invention is the provision in the construction of each articulated member of a base plate member to which connector links outwardly extending in opposite direction are each pivotally fastened. The outer ends of the connector links are joined to the base plates of the adjacent member and with them form a continuous chain. The base plates may also carry, if desired, stop means for limiting the pivotal motion of each connector link.

The invention is described in greater detail with reference to the preferred embodiments from which its objects, features and advantages will be fully appreciated. Reference is made to the drawings in which:

Fig. 5 is a plan view of the articulated member of a second preferred embodiment;

Fig. 6 is a side elevation of the articulated member of the second preferred embodiment shown in Fig. 5;

Fig. 7 is a partial cross-sectional view taken at section 7—7 of Fig. 6;

Fig. 8 is a side elevation of an alternative shoe construction;

Fig. 9 is a cross-sectional view of a guide shield member taken at section 9—9 of Fig. 10;

Fig. 10, elevation back of a guide shield member showing means for securing it to the base plate;

Fig. 11 is a cross-sectional view taken at 11—11 of Fig. 6 showing the manner of securing the shield member shown in Figs. 9 and 10.

Figure 1:
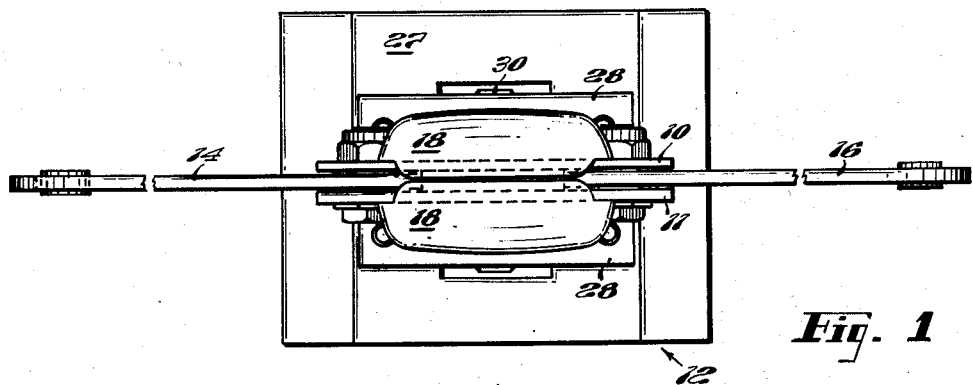
Fig. 1 is a plan view of the articulated member of a first preferred embodiment.
Figure 2:
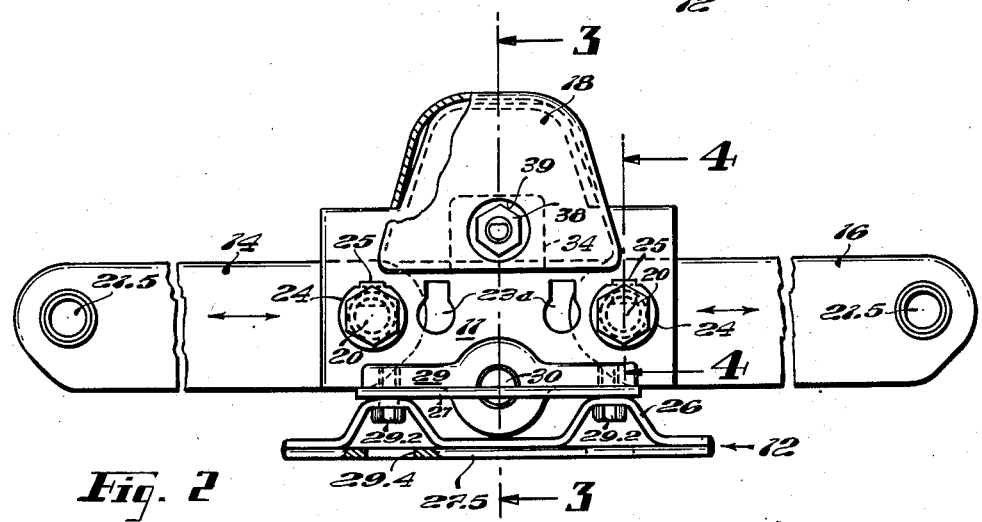
Fig. 2 is a side elevation of the articulated member of first preferred embodiment shown in Fig. 1.
Figure 3:
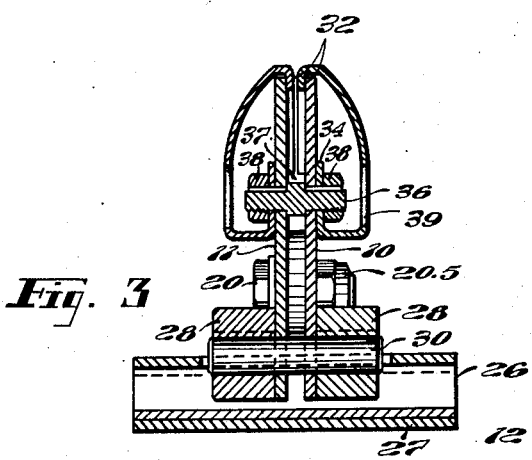
Fig. 3 is a cross-sectional view taken at section 3—3 of Fig. 2.
Figure 4:
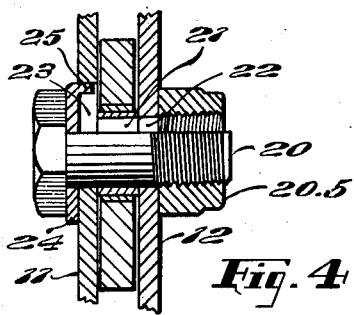
Fig. 4 is a partial cross-sectional view taken at section 4—4 of Fig. 2.
Figure 14:
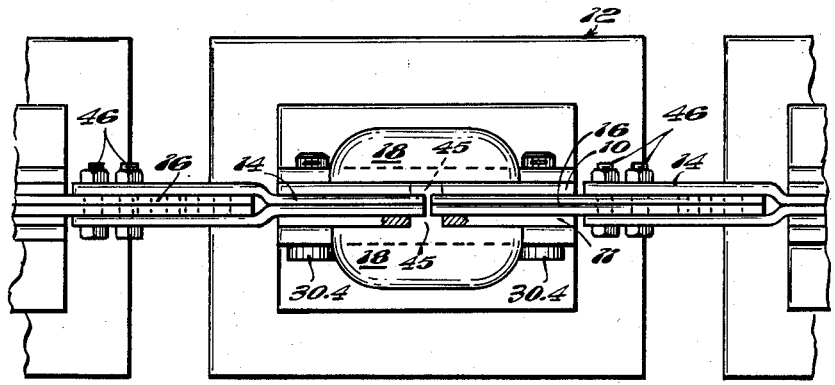
Figure 15:
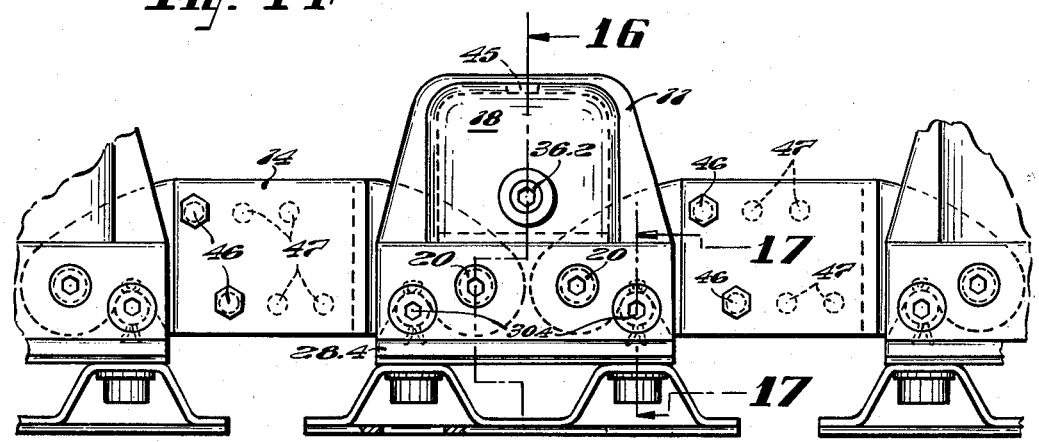
Figure 16:
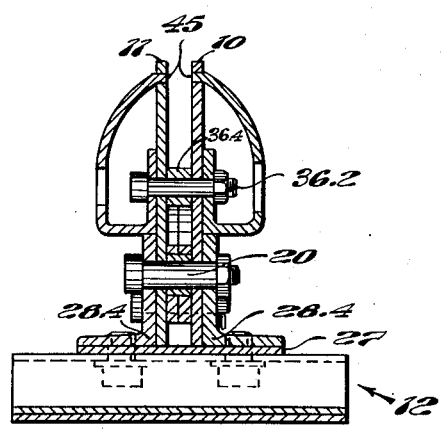
Figure 17:
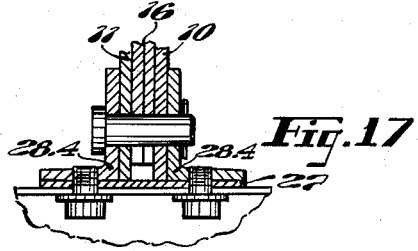
Figure 18:
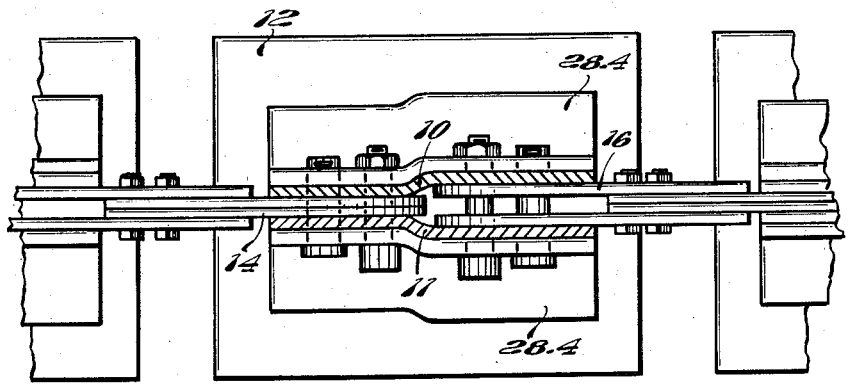
Figure 19:
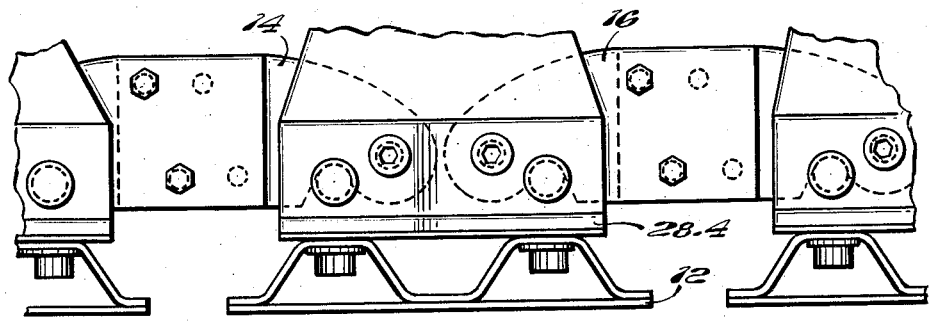
Figure 20:
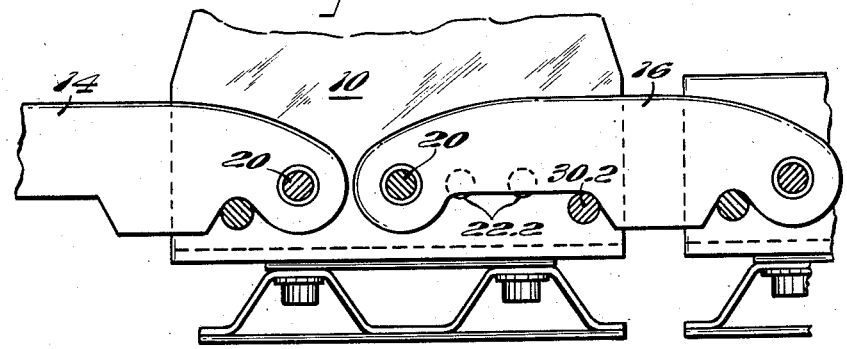
Figure 25:
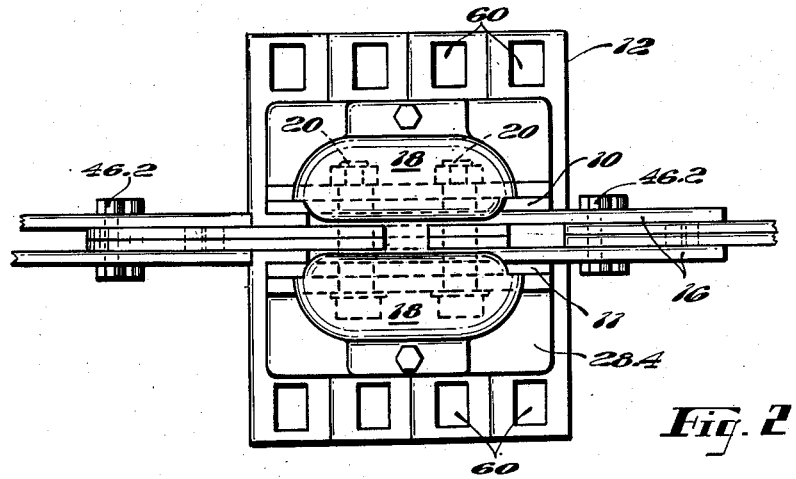
Figure 26:
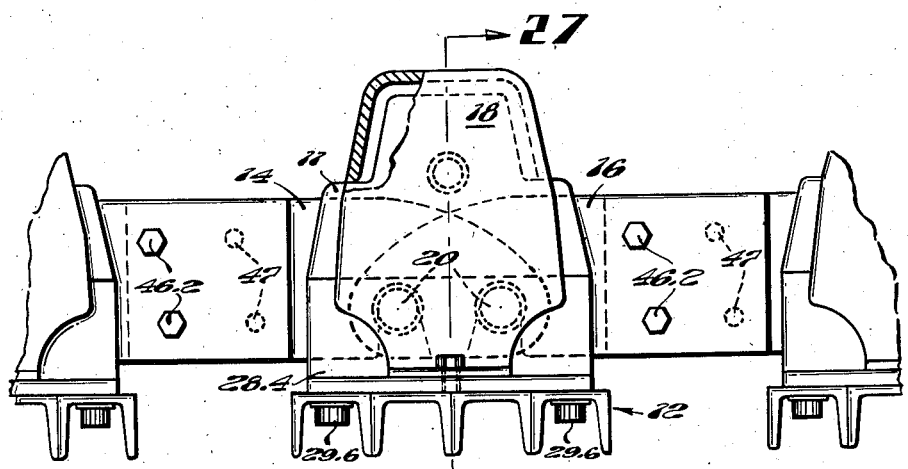
Figure 27:
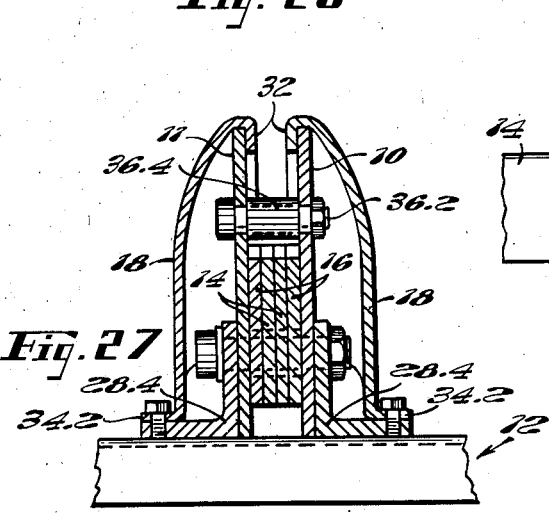
Figure 28:
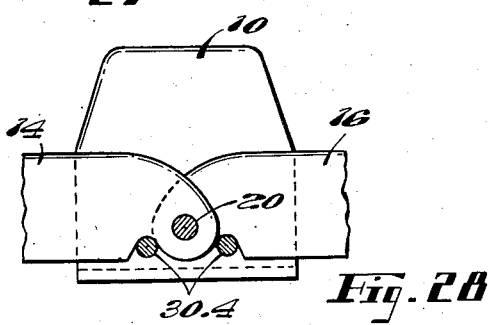

Fig. 12 is a side-elevation showing a form of connector link construction and means connecting two together permitting variation of the length of the connection;

Fig. 13 is a plan view of the connector link assembly shown in Fig. 12;

Fig. 14 is a plan view of the articulated member of a third embodiment of this invention;

Fig. 15 is a side elevation of the articulated member of the third preferred embodiment shown in Fig. 14;

Fig. 16 is a cross-sectional view taken at section 16—16 of Fig. 15 showing a modified form of shield construction;

Fig. 17 is a partial cross-sectional view taken at 17—17 of Fig. 15;

Fig. 18 is a plan view showing the base plates and connector links of the articulated member of a fourth embodiment of this invention;

Fig. 19 is a side elevation showing the base plates and connector links of the articulated member of the fourth embodiment shown in Fig. 18;

Fig. 20 is a side elevation showing the base plates and connector links of the articulated member of a variation of the fourth embodiment in which adjustment of the length of linkage may be varied;

Fig. 21 is a plan view showing the base plates and connector links of a fifth embodiment in which one of the base plates is in the form of a removable cover plate;

Fig. 22 is a side elevation of the lower portion of the embodiment shown in Fig. 21;

Fig. 23 is a cross-sectional view taken at section 23—23 of Fig. 22;

Fig. 24 is a cross-sectional view of a modification of the invention by which the base plates are connected together by a lower flange which may also serve to secure the shoe in place;

Fig. 25 is a plan view of a sixth embodiment of this invention;

Fig. 26 is a side elevation of the sixth embodiment shown in Fig. 25;

Fig. 27 is a cross-sectional view taken at 27—27 of Fig. 26;

Fig. 28 is a side elevation showing a modification in the fastening of the connector links to the base plates in a seventh embodiment of the invention;

Fig. 29 is a perspective view showing the cooperation between the crawler track of a typical embodiment of the invention and a double tired wheel; and Fig. 30 is a perspective view showing the cooperation between the crawler track of a typical embodiment of the invention and a single tired wheel.

In each of the various embodiments of the invention shown in the above drawings and described in detail below, each articulated member is formed about a pair of generally vertical spaced parallel base plates 10—11 which carry rigidly fixed thereto a shoe member 12 serving as the tread portion of the crawler track. Pivotally fastened between each pair of base plates are opposed connector links 14 and 16 which may be connected at their outer ends to the next articulated member to form the chain assembly comprising the crawler track. Guide shields 18—18 in the form of opposed shell sections having rounded outer surfaces designed to ride against the side of the tire, are desirably provided mounting the top of the base plates 10—11 and serve to position each articulated member properly with respect to the tire.

In the embodiment shown in Figs. 1-4 the connector links 14 and 16 are pivoted between the base plates 10 and 11 by means of bolts 20 which pass through an appropriate bushed opening 21, near the end of each connector link and through corresponding openings 22 and 23 in the base plates 10 and 11. In the embodiment illustrated, the bolt 20 is flattened on one side to give it a D-shaped cross-section which serves to facilitate alignment of the connector links with the base plates during assembly by virtue of the reduced cross-section of the bolt and the camming action occasioned by twisting it. To hold the bolt in place and prevent its twisting, one of the openings 23 in one of the plates 11 is formed with an elongated extension, and a key member 24 having a D-shaped opening fits securely around the bolt with a lug 25 extending inwardly through the extension to hold the key member 24, and through it the bolt 20, against rotation. A nut 20.5 threaded to the bolt then holds the entire assembly in proper functional relationhip.

The shoe member 12 here takes the form of a corrugated member 26 located between and secured to an upper plate 27, and a lower plate 27.5 and is carried by the base plates 10 and 11 by means of aligned pillow blocks 28 having opposed lateral wings 29 to which the upper plate 27 is bolted. Access to the bolts 29.2 is had through appropriate openings 29.4 in the lower flat member 27.5. The pillow blocks 28 receive a pin 30 which passes through the base plates 10 and 11 to hold the shoe in place with the upper plate 27 in contact with the lower edge of the base plates. The upper plate is cut away to accommodate the lower portions of the pillow blocks 28 with the edges of the cut away portion opposite the pin 30 to hold it in place.

It will here be noted that the connector links 14 and 16, when extended outward engage the upper side of the shoe 12 at their lower edges, and may thus be limited in their pivotal motion by the shoe. Frequently, it is desired that the links 14 and 16 be limited so as not to pivot below the extended position, for then the extended section of the crawler track in contact with the ground will not deflect upwardly but will be rigid and support part of the load. Alternative means of limiting the pivotal freedom of the links are suggested below with reference to other embodiments. In many cases, no such limitation is desired, in which case the links may be formed so that their lower edges are well above the shoe so that they may be pivoted to below the extended position.

The guide shields 18 in the embodiment shown in Figs. 1-4, best shown in Figs. 9 and 10, are each formed at their inner edges with a downwardly extending upper lip 32 which engages an upward extending portion of the base plate, and an upwardly extending lower tongue 34 which is perforated to be engaged by a lug 36 which passes through the base plates 10 and 11. The lug 36 is conveniently formed with an enlarged central portion 37 which serves as a spacer for the upper portion of the base plates, and is conveniently flattened at its sides to give it a D-shaped cross-section. The guide shields 18 are held to the lug 36 by means of nut 38, access to which is provided by appropriate openings 39 in the shields.

A further feature of the embodiment shown in Figs. 1-4 consists in the provision for adjusting the length of the linkages, and of the track as a whole, by providing extra sets of holes in the base plates, as shown at 23a, to which the connector links 14 and 16 may be pivoted if desired.

In the assembly of articulated members of the type shown in Figs. 1-4, a single link only is provided between each base plate and shoe assembly. Thus, what is a left hand link 14 for one such assembly becomes a right hand link 16 for the adjacent assembly. It will be noted that each link 14 and 16 is shown as having an opening 21.5 in its outer end. These openings engage corresponding bolts 20 in the base plates of the adjacent assemblies.

A second embodiment of the invention as shown in Figs. 5-7 is the same as that shown in Figs. 1-4, except in the manner by which the shoe 12 is fastened to the base plates 10 and 11, and in the form of the connector links 14 and 16.

In this second embodiment, an L-shaped angle bracket 28.2 having a horizontal bore in each end of the vertical portion is provided on each side of the base plates, and held by pins 30.2 which pass through appropriate holes in the base plates 10 and 11. Cotter pins 30.7 are provided at the ends of each pin 30.2 to hold it in place. The lower portions of the angle members carry the shoe 12 by means of the bolts 29.2 and serve to mount the shoe in place. The center parts of the upright portions of the brackets are preferably cut away as best shown in Fig. 11 to permit the pivot bolts 20 and their nuts 26 to clear the brackets, whereby the length of the bolts may be minimal and not protrude the extra length which would be necessary if they also passed through the upright parts of the brackets 28.2.

The pins 30.2 serve in this embodiment not only to retain the shoe 12 in place but also as stop members limiting the pivotal motion of the connector links 14 and 16. To permit sufficient pivotal freedom of the connector links such that they may extend horizontally, the lower edges must be cut away as indicated at 14.2 and 16.2, to clear the pins 30.2. Also, it is preferable that the upper surface of the pins 30.2 be flattened to provide a substantial contact surface cooperating with the lower edges of the connector links 14 and 16.

When a degree of variation in the length of the linkages greater than is provided by the additional sets of holes 23a is desired, the connector links 14 and 16 themselves may be made of variable length, one preferred construction for accomplishing this being shown in Figs. 12 and 13. Each connector link is formed in two sections 40 and 41, the outer ends of which are received in a sleeve 42. The sleeve 42 is formed with a pair of aligned holes 43 and the end of each link section 40 and 41 is provided with a row of holes 44 any one of which may be brought into alignment with the corresponding hole 43 in the sleeve. Thus, by aligning one or the other of the holes in the connector link sections 40 or 41 with the corresponding hole 43 in the sleeve, and bolting the connecting sections in place, the length of the link may be varied.

Conveniently, one of the holes 43 is provided with an elongated extension by which a key member 45, similar to the key member 24 described with reference to the embodiments shown in Figs. 1 through 4, may be utilized to hold a flattened D-shaped bolt.

A modified shoe construction is suggested by Fig. 8 and consists of a pair of corrugated members 48 and 49 positioned with the corrugations forming inwardly opposed ridges joined together, as by welding, to form a central panel which is located between the upper plate 27 and lower plate 27.5.

A third embodiment of the invention is shown in Figs. 14 through 17 and incorporates modifications in the construction of the connector links and in the construction of the guide shields. In this embodiment the shoe 12 is secured to the base plates 10 and 11 through angle members 28.4, each having an inner vertical section which extends upwardly alongside the corresponding base plate and terminating in a flat shoulder. The angle members 28.4 are held to the base plate by means of the bolts 20 on which the connector links 14 and 16 pivot, and by additional pins 30.4 which serve as stop members for the connector links.

In this embodiment, the guide shield 18 is also of a modified construction primarily in that it is formed with an upper horizontal tongue 45 which engages a corresponding opening in each base plate 10 and 11 which, it will be seen, extend above the upper edge of the shield 18. Further support of the shield is provided by forming it so that its lower inner edge rests upon the upper edge of the angle member 28.4. The shields 18 are rigidly secured to the base plates 10 and 11 by a bolt 36.2, the central portion of which is surrounded with a spacer member 36.4 which serves to position the upper portions of the base plates.

The connector links 14 and 16 in this embodiment are each formed of a pair of plates, with the links 14 on the left hand side being spread at their outer ends to form a fork between which the links 16 of the right hand of the adjacent articulated member is received. The interconnected links 14 and 16 of adjacent members are held together by bolts 46 passing through aligned holes in the inter-connected links. The inner link 16 is conveniently provided with additional sets of holes 47 which may be utilized if the length of the link is to be varied.

The fourth embodiment shown in Figs. 18 and 19 is generally similar to that shown in Figs. 14 through 17 with the primary exception that the pair of blanks forming the outer connector links, here the right hand links 16, are flat and are hence spaced a substantial distance apart. To accommodate this additional width of the connector links 16, the base plates 10 and 11 are formed with a Z bend by which the space between them is widened in the region of the right hand connector link 16.

Fig. 20 shows a modified form of connector link construction in which the left hand link 14 is at a fixed location on the base plates 10 and 11 while the right hand link 16 is adjustably located by virtue of several sets of holes 22.2 in the base plates to which the link 16 may be pivoted. The stop pin 30.2 will strike this connector link 16 in one of several locations, the locus of which is cut away to permit the link to extend outwardly when pivoted at any of the several locations.

In the fifth embodiment suggested by Figs. 21 through 23, one of the base plates 10 consists in the upstanding flange of an angle iron bracket 28.4 to which the shoe (not shown) is attached. The other base plate 11 consists in a removable cover plate secured in spaced relation to the fixed plate by means of threaded studs 50 extending outwardly from the fixed plate through appropriate openings in the cover plate. Spacer members 52 surrounding the studs between the plates serve to secure the two plates in the proper space relationship. As shown, two of the studs are located near the bottom of the base plate and pass through a groove 50.2 extending inwardly from a lower edge. The third stud passes through a hole located near the center of the plate. With this arrangement, only the nut on the central stud need be removed entirely when the face plate 11 is removed, since by loosening the nuts on the lower studs, the face plate may be swung outwardly to clear the central stud and then raised from the two lower studs which engage it at the lower inwardly extending grooves.

In this embodiment, the connector links 14 and 16 are mounted on pins 54 formed with enlarged central regions by which they are retained between the base plates 10 and 11 and also by which they also serve to space these two members. Several holes for these pins may be provided, as shown in Figs. 21 and 22, to permit an adjustment of the length of the links.

In Fig. 24 is shown a modified construction in which the angle members 28.4 by which the shoe is attached to the base plates 10 and 11 are so formed that the horizontal portions of one underlie the base plates and join with the other angle bracket, thus forming a channel with upright walls outwardly adjacent the base plates 10 and 11 and with a lower outwardly extending horizontal flange 28.5 which merges with the lower section of the channel. This lower section may be drilled and tapped to accommodate studs 29.5 to which the shoe may be secured.

A sixth embodiment of the invention is shown in Figs. 25 through 27 in a crawler track particularly adapted for use in snow. The shoe 12 consists of a number of channel irons welded together side by side with their horizontal sections forming an upper shoe surface and with the walls of the channels extend downwardly to form grousers which provide greatly improved traction. As shown in Fig. 25, a good deal of the horizontal portions of the channels may be cut away to provide holes 60 which accumulated snow to be easily dislodged.

The shoes in this embodiment are held by bolts 29.6 to angle brackets 28.4 which flank and are fastened to the base plates 10 and 11 by means of bolts 20. The bolts 20 serve also as the pivot connections for the connector links 14 and 16. In this embodiment, the connector links 14 and 16 overlap in the region between the base plates, whereby the pivot for one link serves as the stop pin for the other link, and each link is cut away at a lower region so as to be able to pivot around the bolt to which the other link is fastened.

Each of the links preferably consists of a pair of plates with those extending to the right, designated 16, flanking those extending to the left designated 14, as best shown in Fig. 25. They are most easily connected together in assembling the several articulated members by providing a set of holes in the outer links and one or more sets of holes in the inner links alignable with the holes of the outer links. They may thus be secured together at adjustable lengths by bolts 46.2.

In this embodiment, a modified guide shield 18 construction is also shown. Each is formed with a downwardly extending upper lip 32 at the top, which engages the top portion of the base plates 10 and 11, and the bottom portion extends downwardly all the way to the horizontal portion of the angle brackets 28.4 and terminates in an outwardly extending flange 34.2 which is bolted to the brackets. Rigidity of the upper portion of the member is provided by a spacer 36.4 which is positioned between the base plates in the upper portion of the structure about an upper bolt 36.2.

A seventh embodiment of the invention is shown in Fig. 28 and is generally similar to the sixth embodiment described with reference to Figs. 25 through 27, but utilizes a single bolt 20 or pivot for both of the connector links 14 and 16 and separate, independent stop members 30.4 positioned one on either side and generally below the pivot bolt 20. The remaining structure of this embodiment may take any of the several forms described above.

In general, the several articulated members joined together to form the crawler track assembly, are designed to ride with the upper portion of the shoe members 12 in contact with the tread of the tire and with the rounded surfaces of the guide shields 18 in proper contact with the side walls of the tire, thereby to position the crawler track with respect to the tires and the vehicle as a whole.

In Fig. 29, there is shown a typical assembly for use with a double-tired wheel in which the base plates 10 and 11 and shields 18 are centrally located to travel between the two tires. To improve the traction between the tire and each of the shoe members, cleats 55 are preferably provided on each shoe member.

With a single-tired vehicle, the linkage structure including the connector links and the base plates are provided on each side of the shoe member with the guide shields 18 facing inwardly in opposed pairs to hug the outer walls of the tire, as shown in Fig. 30.

From the foregoing description, it will be readily understood that this invention may take the form of numerous embodiments and incorporate numerous features, all of which are described generally above. It is accordingly contemplated that modifications of the construction will occur to those skilled in the art, and that such may be made without departing from the scope of this invention.

Having thus described my invention and described in detail preferred embodiments thereof, I claim and desire to secure by Letters Patent:

1. A crawler track for tired vehicles comprising a chain assembly of connected members, each member comprising a pair of spaced upright parallel base plates; rigid links between said members each being pivotally secured at opposite ends to the base plates of adjacent members, and a shoe member secured to the lower part of said base plates.

2. A crawler track for tired vehicles comprising a chain assembly of connected members, each member comprising a pair of spaced upright parallel base plates; rigid links between said members each being pivotally secured at opposite ends to the base plates of adjacent members, and a shoe member secured to the lower part of said base plates; and a shield member adapted to contact the sides of the tire and guide said member in functioning relationship therewith, capping at least one of said base plates.

3. A crawler track for tired vehicles comprising a chain assembly of connected members, each member comprising a pair of upright parallel base plates, a pair of rigid link members between each pair of said base plates each pivotally secured to said base plates at one end and connected at the other end to the base plates of the adjacent member, a spacer member between said base plates above said links, means holding said base plates against said spacer member whereby a rigid spaced relationship is secured, and a shoe member fixedly secured to the lower part of said base plates.

4. A crawler track for tired vehicles comprising a chain assembly of connected members, each member comprising a pair of upright parallel base plates, each having a pair of aligned holes with at least one of each pair of holes having an outward extension, a pair of link members between each pair of said plates each having a hole at one end in alignment with holes in said base plates and connected at its other end to the adjacent member, a D-shaped bolt extending through each link and the holes aligned herewith, a collar having a corresponding D-shaped opening surrounding each D-shaped bolt and having an inwardly extending lug received in said extension holding said bolts against rotation, and a shoe member fixedly secured to the lower part of said base plates.

5. A crawler track for tired vehicles comprising a chain assembly of connected members, each member comprising a pair of spaced upright parallel base plates; rigid links between said members each being pivotally secured at opposite ends to the base plates of adjacent members, stop means extending between said base plates for limiting the pivotal motion of said links; and a shoe member secured to the lower part of said base plates.

6. A crawler track for tired vehicles comprising a chain assembly of connected members and connecting links joining said members, each member comprising a pair of upright parallel spaced plates, an angle bracket having an upstanding flange flanking the lower portions of each of said plates and an outstanding flange integral therewith, a shoe member fastened to said outstanding flange, means pivotally connecting said links between said plates, and pin members extending through the upstanding flange portions of said angle brackets at each end thereof, said pin members being positioned to serve as stop members limiting the pivotal motion of said links.

7. The crawler track for tired vehicles defined by claim 1 wherein the base plates are provided with a plurality of aligned holes serving as pivot bearings for at least one of said links whereby the location of said pivot and the length of the link may be varied.

8. The crawler track for tired vehicles defined by claim 1 wherein the links are formed in two sections joined in a sleeve by means for varying the location of at least one of said sections in the sleeve.

9. The crawler track for tired vehicles defined by claim 2 wherein the shield member is formed with a downwardly extending lip which extends over and around the top of the base plate.

10. A crawler track for tired vehicles comprising a chain assembly of connected members and connecting links joining said members, each member comprising a pair of upright parallel spaced plates, an angle bracket having an upstanding flange flanking the lower portions of each of said plates and an outstanding flange integral therewith, a shoe member fastened to said outstanding flange, means pivotally connecting said links between said plates, and pin members extending through the upstanding flange portions of said angle brackets at each end thereof, said pin members being positioned to serve as stop members limiting the pivotal motion of said links, and a shield member adapted to contact the sides of the tire and guide said member in functioning relationship therewith secured to the upper end of at least one of said base plates, said shield member having a lower edge portion abutting the upper edge of the upstanding flange.

11. A crawler track for tired vehicles comprising a chain assembly of connected members and connecting links pivotally secured to said members, each of said members comprising a pair of spaced upright parallel base plates, and a shoe member secured to the lower part of said base plates, said links being pivotally secured by a pin between said base plates with their ends overlapping with each link passing and abutting against the pin securing the other link whereby each pin serves as a stop member limiting the pivotal motion of the other link.

12. A crawler track for tired vehicles comprising a chain assembly of connected members and connecting links pivotally secured to said members, each of said members comprising a pair of spaced upright parallel base plates and a shoe member secured to the lower part of said base plates, said links being pivotally secured at their ends to said members between said base plates by a pin passing through said plates and the ends of both links joining said member, and stop members extending between said plates limiting the pivotal motion of said links.

References Cited in the file of this patent

UNITED STATES PATENTS

| | | |
|---|---|---|
| 1,970,100 | Masury | Aug. 14, 1934 |
| 2,450,592 | Howison | Oct. 5, 1948 |
| 2,516,115 | Hagenbuch et al. | July 25, 1950 |
| 2,561,678 | Tripp | July 24, 1951 |
| 2,599,592 | Stewart | June 10, 1952 |
| 2,755,146 | Galanot | July 17, 1956 |

FOREIGN PATENTS

| | | |
|---|---|---|
| 777,114 | France | Nov. 17, 1934 |